United States Patent
Hulbert et al.

(10) Patent No.: US 7,110,781 B1
(45) Date of Patent: Sep. 19, 2006

(54) MOBILE TELECOMMUNICATIONS SYSTEMS

(75) Inventors: Anthony Peter Hulbert, Shirley, Southampton (GB); Stephen William Wales, Southampton (GB); Geoffrey Alan Halls, Romsey (GB); Reinhard Koehn, Berlin (DE)

(73) Assignee: Roke Manor Research Ltd., Romsey (GB)

( * ) Notice: Subject to any disclaimer, the term of this patent is extended or adjusted under 35 U.S.C. 154(b) by 395 days.

(21) Appl. No.: 10/069,269

(22) PCT Filed: Aug. 11, 2000

(86) PCT No.: PCT/GB00/03111

§ 371 (c)(1),
(2), (4) Date: May 22, 2002

(87) PCT Pub. No.: WO01/15340

PCT Pub. Date: Mar. 1, 2001

(30) Foreign Application Priority Data

Aug. 24, 1999 (GB) ................................ 9919973.9
Mar. 24, 2000 (GB) ................................ 0007143.1

(51) Int. Cl.
*H04B 7/01* (2006.01)
(52) U.S. Cl. ................... 455/502; 370/350; 370/503
(58) Field of Classification Search ............... 455/502, 455/436, 442, 456.1, 404.2, 438, 440; 370/331, 370/324, 350, 395.62, 503, 507–514, 520
See application file for complete search history.

(56) References Cited

U.S. PATENT DOCUMENTS

| 4,812,852 | A | 3/1989 | Bent et al. |
| 5,293,645 | A | 3/1994 | Sood |
| 5,317,323 | A | 5/1994 | Kennedy et al. |
| 5,363,376 | A | 11/1994 | Chuang et al. ............ 370/95.3 |
| 5,448,570 | A | 9/1995 | Toda et al. ................ 370/95.3 |
| 6,134,228 | A * | 10/2000 | Cedervall et al. .......... 370/335 |
| 6,243,587 | B1 * | 6/2001 | Dent et al. ................ 455/456.2 |
| 6,567,482 | B1 * | 5/2003 | Popovic' .................... 375/343 |
| 6,590,881 | B1 * | 7/2003 | Wallace et al. ............. 370/332 |
| 6,606,309 | B1 * | 8/2003 | Wang ........................ 370/322 |
| 6,721,299 | B1 * | 4/2004 | Song ......................... 370/342 |

FOREIGN PATENT DOCUMENTS

| EP | 0286614 B1 | 3/1988 |
| EP | 0286614 | 12/1991 |
| EP | 0560079 B1 | 2/1993 |
| EP | 0398773 | 8/1994 |

(Continued)

OTHER PUBLICATIONS

Copy of British search report dated January 8, 2001.

(Continued)

*Primary Examiner*—Edward F. Urban
*Assistant Examiner*—Raymond S. Dean
(74) *Attorney, Agent, or Firm*—Crowell & Moring LLP

(57) ABSTRACT

Described herein is a method of providing synchronization between a plurality of base stations (300) in a telecommunications system which comprises providing a random access channel in each cell (320). A local base station (300) uses the random access channel in the local cell to transmit a synchronization signal to neighboring base stations. For each base station, the time differences between received synchronization signals from neighboring base stations and the local synchronization signal are calculated. Each set of time differences is either used to autonomously synchronize the local base station or is centralized in a radio network controller and a set of corrections distributed from the RNC to the base stations.

11 Claims, 4 Drawing Sheets

FOREIGN PATENT DOCUMENTS

| | | |
|---|---|---|
| EP | 0437835 | 4/1995 |
| EP | 0474138 | 11/1996 |
| EP | 0 817 405 A2 | 6/1997 |
| EP | 0903873 A1 | 12/1997 |
| EP | 0954122 A1 | 4/1998 |
| GB | 2330716 | 4/1999 |
| GB | 2347294 | 8/2000 |
| JP | 2164140 | 6/1990 |
| WO | 94/28643 | 12/1994 |
| WO | 99/57826 A1 | 12/1994 |
| WO | 95/26510 | 10/1995 |
| WO | 94/28643 A1 | 11/1999 |

OTHER PUBLICATIONS

Autonomous inter Base Station synchronisation via a common broadcast control channel; X. Lagrange and P. Godlewski, Ecole Nationale Superieure des Telecommunications (Telecom Paris) IEEE 1994, pp. 1050-1054.

* cited by examiner

MOBILE TELECOMMUNICATIONS SYSTEMS

The present invention relates to improvements in or relating to mobile telecommunications systems and is more particularly concerned with synchronisation of base stations within a telecommunications system.

BACKGROUND OF THE INVENTION

The UMTS terrestrial radio access time division duplex (UTRA TDD) mode is based on a combination of code division multiple access (CDMA) and hybrid time division multiple access (TDMA). UMTS is an acronym for universal mobile telecommunication system as will be understood by persons skilled in the art.

Reliable operation in the UTRA TDD mode, incorporating the combined TD-CDMA multiple access scheme, requires synchronisation between base stations within a compliant telecommunications system. Moreover the mode also requires the provision of position information for the mobile stations affiliated to each base station. Synchronisation between base stations is also desirable in order to maximise system capacity. To these ends, the synchronisation of base stations must be achieved at the levels of time slots, frames and multi-frames, where a multi-frame is a repeating cycle of a number of frames.

One known mechanism for synchronising the base stations is to equip each base station with a global positioning system (GPS) receiver. However, this is not always appropriate or even possible; for example, an area of deployment may be shadowed from the GPS constellation of satellites by tall buildings. For this and other reasons, alternative mechanisms for synchronising the base stations are required.

In an alternative mechanism, the base stations are synchronised over the backhaul network; the network which enables base stations to switch mobile communications into public telephone networks or the internet. However, if this mechanism is implemented according to a packet protocol (for example, internet protocol (IP) or asynchronous transfer mode (ATM)), then synchronisation will only be possible to a coarse accuracy.

SUMMARY OF THE INVENTION

It is therefore an object of the present invention to obviate or at least mitigate the problems of synchronisation of base stations.

In accordance with a first aspect of the present invention, there is provided a method of providing synchronisation between a plurality of base stations in a telecommunications system, for each base station there is a telecommunications cell within which there is at least one mobile station and for each base station the method comprises the steps of: providing at least one channel for usage in the telecommunications cell; a transmission step, wherein said at least one channel is utilised for transmission of a synchronisation signal, the transmission being from a first base station to those remaining base stations within the telecommunications system which are within transmission range; and a first calculation step, in which a time difference between clock pulses from the first base station and clock pulses transmitted by other base stations within transmission range is calculated.

Preferably the method has the further steps: a reporting step, in which each of the plurality of base stations reports the time differences calculated in the time difference calculation step to a radio network controller; a second calculation step, wherein a synchronising adjustment corresponding to each base station is calculated from the reported time differences; and an adjusting step, wherein each base station is individually sent the corresponding synchronising adjustment and the clock of the base station concerned is adjusted accordingly.

Advantageously, each of the plurality of base stations can act autonomously on the basis of information received from the available remaining base stations to adjust the clock timing of that base station.

The channel utilised for transmission of the synchronisation signal is preferably a random access channel (RACH) which is transmitted at a frequency within a band of frequencies that is provided for communications with mobile stations. The random access channel advantageously comprises a single time slot per TDMA frame. More preferably, the RACH is allocated to transmissions from mobile stations to initiate communications. Preferably, communications are initiated by requesting a resource unit (time slot and CDMA code combination) for uplink usage.

The method preferably further comprises a scheduling step in which the utilisation of each RACH time slot for base station synchronisation is allocated according to a schedule.

More preferably, the method further comprises a silencing step in which a second channel is used by the base station to silence mobile station communications in the RACH time slots to allow the transmission of synchronisation transmissions to other base stations. This second channel is most preferably the broadcast control channel (BCCH).

In accordance with a second aspect of the present invention, there is provided a method of locating a mobile station within a telecommunications cell forming part of a telecommunications system, the telecommunications cell comprising a base station and at least one mobile station, the method comprising the steps of: determining the location of at least three base stations; scheduling synchronisation measurements for each of the base stations utilising a random access channel; transmitting a signal from the mobile station; receiving the transmitted signal at each of the three base stations; comparing the received signals with timing signals in each of the base stations; and using the comparison at each base station to determine the location of the mobile station.

Other objects, advantages and novel features of the present invention will become apparent from the following detailed description of the invention when considered in conjunction with the accompanying drawings.

DETAILED DESCRIPTION OF THE INVENTION

Figure 1:
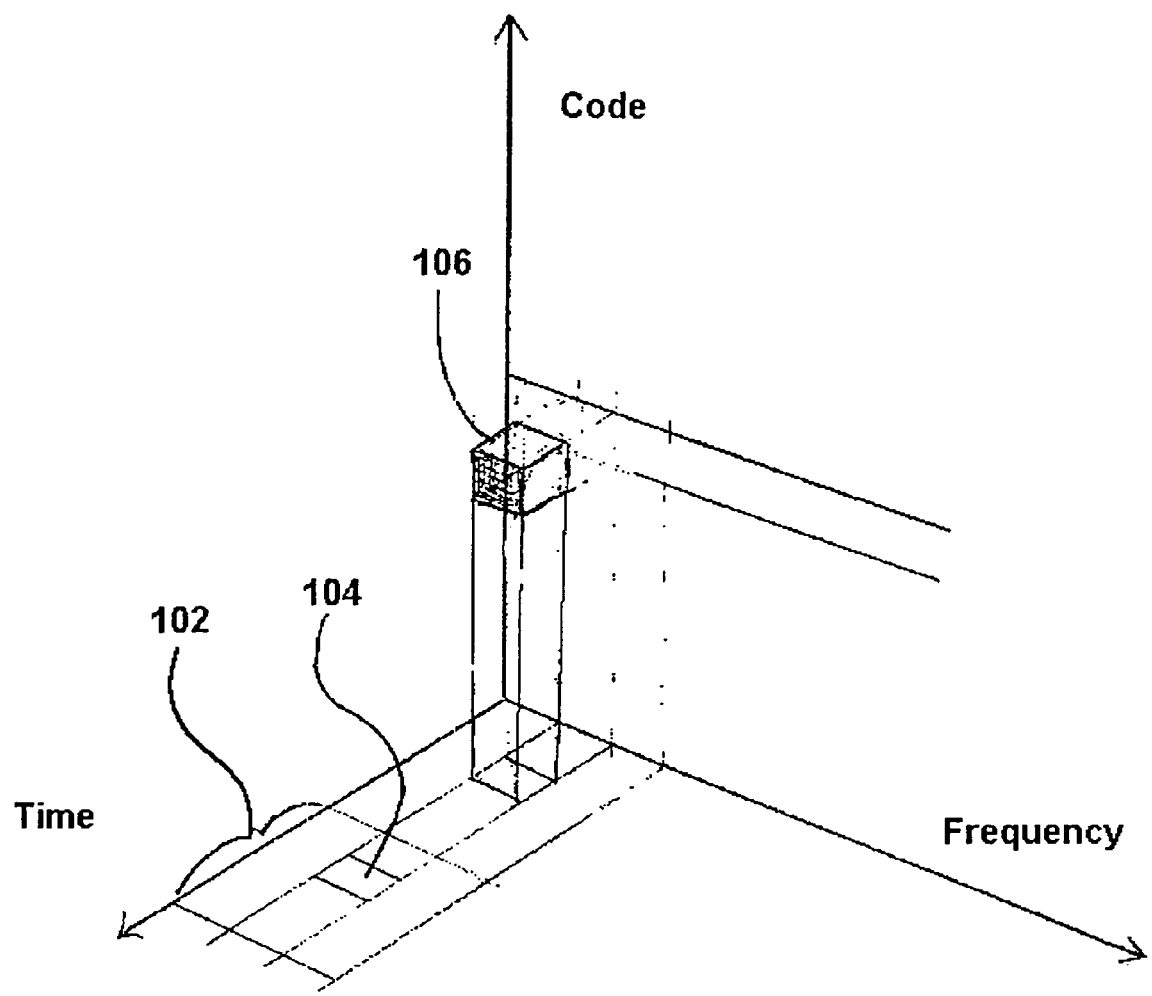
FIG. 1 shows a schematic diagram of the UTRA TDD mode.

In FIG. 1, the UTRA TDD mode is illustrated. Information is transmitted in bursts at a certain combination of frequency, time (within a frame 102), and coding. Frames 102 are divided into time slots 104 and each time slot is just long enough for a single burst of information.

Transmission of information is multiplexed through the use of orthogonal codes (CDMA). The information transmitted within a particular time slot is divided according to these codes: as a result, each burst contains a plurality of independent time slot and code combinations, called resource units 106.

The UTRA TDD mode uses a scheme called Time Division-Code Division Multiple Access (TD-CDMA). This scheme provides for a random access channel (RACH) which is a single time slot 104 per TDMA frame 102. The RACH is allocated to transmissions from mobile stations to initiate communications, usually by requesting a resource unit 106 for uplink usage. The RACH can be utilised for both inter base station synchronisation and for mobile station position location.

Figure 2:
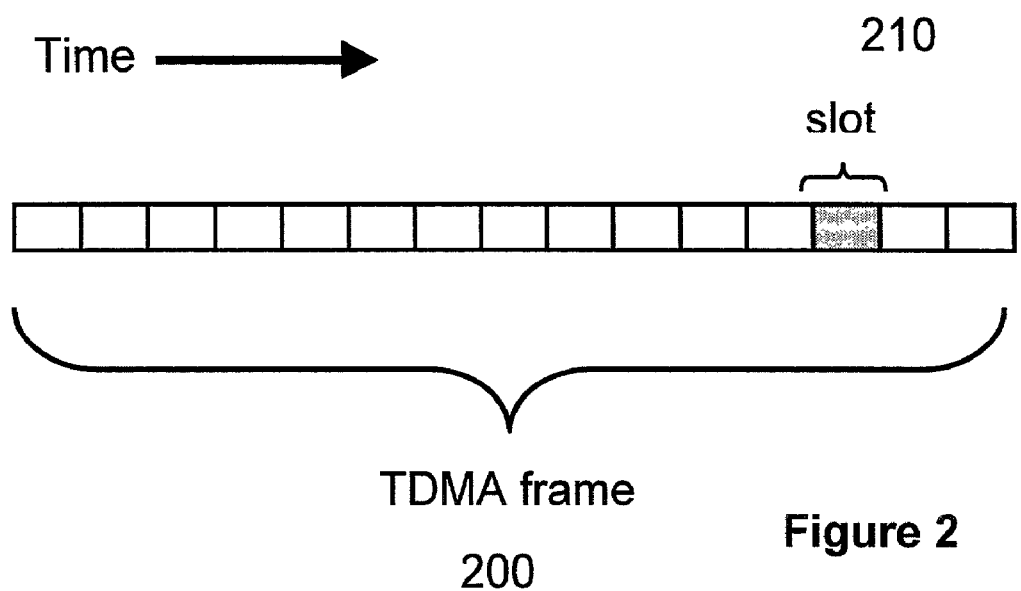
FIG. 2 shows a schematic diagram of one TDMA frame.

A TDMA frame is illustrated in FIG. 2. As will be apparent, each TDMA frame 200 contains a plurality of time slots 210; fifteen time slots in TDD mode, as shown.

Figure 3:
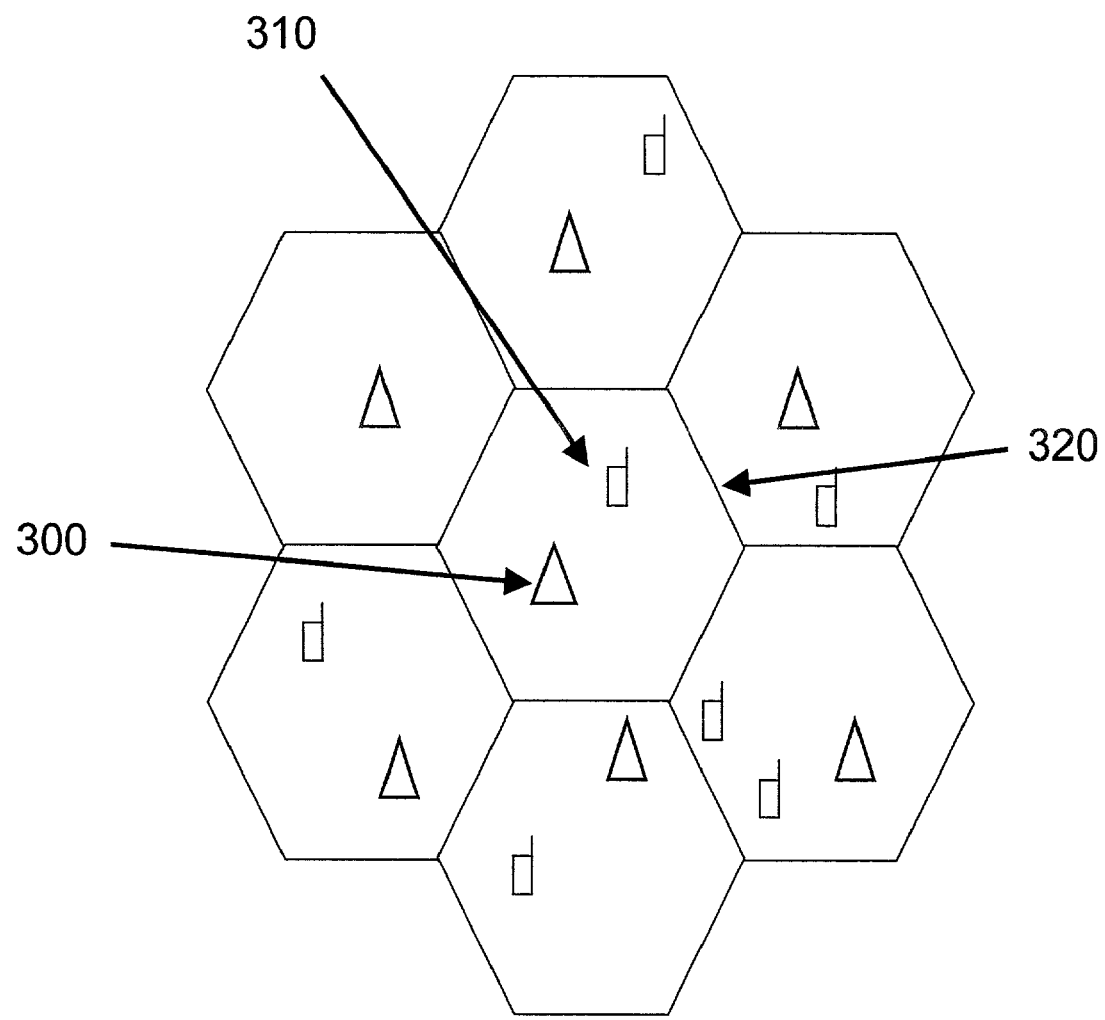
FIG. 3 shows a schematic diagram of a network of telecommunication cells.

FIG. 3 depicts a typical cellular deployment. Each base station 300 has an associated cell 320. The range between neighbouring base stations 300 is roughly double the range from any base station to a mobile station 310 at its cell boundary. In an urban deployment, this typically leads to a path loss which is of the order of 12 dB greater to the neighbouring base station 300 than to the cell-edge mobile station 310. On the one hand, the base station 300 would have a height gain advantage over a mobile station 310 at the same location. On the other hand the base station antennas are typically constructed with a 'down tilt' intended to reduce inter cell interference. These opposing effects are of similar magnitude and will tend to cancel, making the 12 dB figure a reasonable estimate for the increase in path loss.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Figure 4:
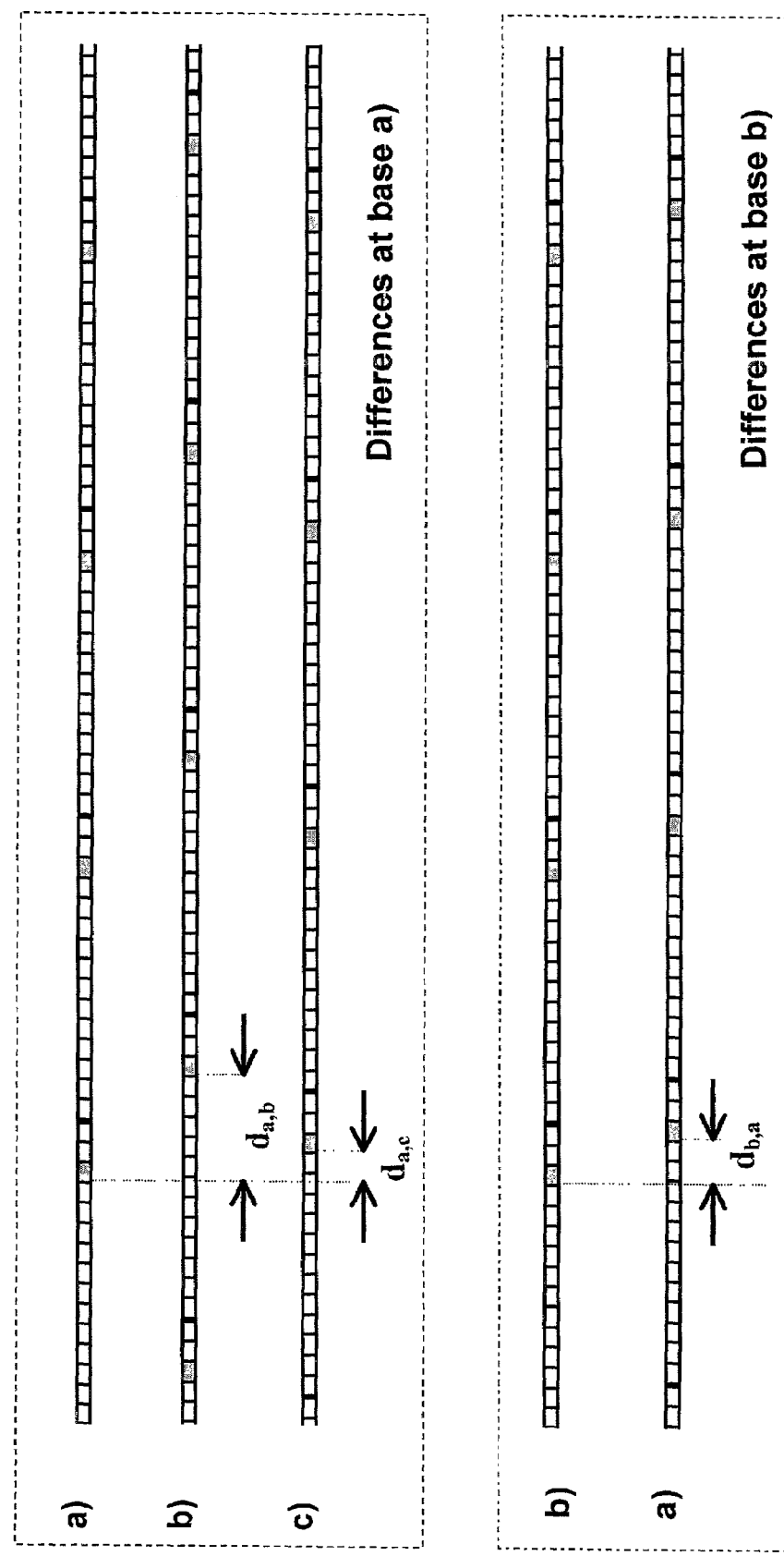
FIG. 4 shows a schematic diagram of the time differences between the is signals from base stations.

FIG. 4 shows how the time differences, $d_{i,j}$, between the local base station 'a' and the neighbouring base stations 'b' and 'c' are derived from the synchronisation signals. The shaded time slot represents the RACH which can carry synchronisation signals. The upper boxed area represents the time differences at base 'a': from top to bottom the lines represent: a) the base station's own signal; b) the delayed signal from base station 'b'; and c) the delayed signal from base station 'c'. Similarly the lower boxed area represents the time differences at base 'b'. There is no line corresponding to base station 'c'—as would be the case when 'c' was out of range of the signal from 'b'.

In the first embodiment of the present invention, there is provided a base station which conforms to the UTRA TDD mode. The base station uses the RACH to synchronise with other base stations which are within transmission range. The base station is arranged to 'steal' the RACH time slot for transmissions to other base stations at suitable times. In this discussion it is assumed that the same time slot will be used for RACH operation in all cells; whilst this assumption is advantageous, it is not essential to the operation of this invention. The times at which a base station should steal a RACH time slot can be determined according to the following criteria:

Firstly, neighbouring base stations must not steal the RACH time slot in the same frame.

Secondly, RACH time slots must be stolen frequently enough to maintain overall base station network synchronisation to the required accuracy.

Lastly, schedules for RACH time slot stealing may be determined either centrally by a radio network controller (RNC) or according to sequence generators resident in the base stations. In the latter case, the sequence generators are arranged in such a way that RACH stealing schedules do not coincide in neighbouring cells. If the RNC is used, it can establish schedules according to this criterion. The schedules may be at regular, pseudo random or constrained random intervals.

When the base station has a schedule assigned for RACH stealing in the near future, at a suitable time it makes a broadcast transmission (preferably on its broadcast control channel, BCCH) to all mobile stations affiliated to the base station, to instruct these mobile stations that the RACH will be unavailable for mobile station transmissions in the forthcoming scheduled stolen RACH time slot. This will clear the stolen RACH time slot for inter cell synchronisation usage.

Arranging for the stealing base station to silence mobile stations affiliated to the stealing base station when the RACH is stolen, will prevent unnecessary collisions on the RACH channel. However, as described so far, the neighbouring base stations will not silence their respective affiliated mobile stations from making RACH transmissions. These RACH transmissions will be power controlled and it should be possible for the neighbouring base stations to receive the transmission from the base station stealing the RACH timeslot and to receive any RACH transmissions from their own affiliated mobile stations. However, in the case where stolen RACH timeslots are scheduled by the RNC, it is optionally possible to arrange for the neighbouring base stations to silence RACH transmissions from their mobile stations using the same procedure as described for the RACH time slot stealing.

In this way the interference to the synchronisation transmission can be substantially removed, except from distant stations. If this option is not employed then interference to the reception of synchronisation transmission in the RACH timeslot may prevent its reception. However, given the statistics of RACH traffic, a high proportion of such measurements should be received.

In the second embodiment of the present invention, an alternative approach to 'stealing' RACH slots for synchronisation is taken. In this approach, RACH slots are arranged throughout the network of base stations to be allocated to synchronisation at regular fixed intervals. During these allocated RACH slots, none of the mobile stations make RACH transmissions, and it is unnecessary to instruct the mobile stations not to make the RACH transmissions since they are capable of determining such times for themselves. However, the base stations do transmit a simple binary signal periodically to indicate that this mode of operation applies: such a transmission would not be necessary in a network where all base stations had associated GPS receivers. In consequence, during the allocated RACH time slots all base stations are either listening for synchronisation transmissions or making them. The subset of base stations making synchronisation transmissions changes from one selected RACH time slot to the next. It is necessary to ensure that the spread of transmissions is such that only one dominant synchronisation signal is received at any given base station in any given selected RACH time slot. The planning of these subsets can be performed either manually or automatically according to scheme similar to dynamic channel assignment (DCA).

Within UTRA TDD, bursts are transmitted within time slots and each burst is sub-divided into 2560 chips which are zoned into two data fields, one midamble field and a guard period. The midamble field contains training sequences. Because the base stations are static and have accurate frequency references, it is possible to perform correlation across the entire time slot. Correlation makes use of training sequences so the synchronisation burst, with the exception of the guard period, is arranged to have no data fields and effectively becomes all midamble. Whole time slot correlation affords a processing gain of about 34 dB. This high processing gain serves to compensate for the increased path loss to the neighbouring cells.

Assuming that every base station sends and receives synchronisation bursts to and from its neighbouring base stations, all of the information necessary for the network wide synchronisation can be aggregated. This can be used in one of two distinct ways, either distributed or centralised.

The first and second embodiments of the invention detail methods of gaining access to RACH timeslots. Either embodiment can be implemented according to the distributed or centralised approaches.

In the distributed approach, every base station acts autonomously on the basis of the information it has received to adjust its clock timing in such a way that, given that all other base stations operate similarly, they will come into synchronisation.

In the centralised approach, all base stations report their results to the RNC which then computes a set of adjustments and signals these adjustments individually to the relevant base stations. Essentially, each base station measures the timing of each received synchronisation burst relative to its own timing. This can be viewed as the timing of the received burst relative to the time at which it would make its transmission. Each base station is provided with a matched filter, matched to the synchronisation code. When a burst is received, there will usually be several discrete paths. The earliest significant path will be taken to provide the timing since this is most likely to correspond to the line of sight path if there is one. The following discussion relates to the centralised synchronisation procedure, following coarse level synchronisation.

Suppose we have a deployment of N base stations. Let the variable $L(i,j)=L(j,i)$ indicate those base stations which are able to hear each other's synchronisation transmissions. If base station i can hear base station j's transmission and base station j can hear base station i's transmission then $L(i,j)=L(j,i)=1$. Otherwise $L(i,j)=L(j,i)=0$. Note that $L(i,i)=0$ for all i. All relative timings are aggregated at the RNC. If base station i hears base station j's transmission with delay $d_{i,j}$ and base station j hears base station i's transmission with delay $d_{j,i}$, then the RNC computes the time differences as $$\delta_{i,j} = \frac{d_{i,j} - d_{j,i}}{2}$$

and $$\delta_{j,i} = \frac{d_{j,i} - d_{i,j}}{2} = -\delta_{i,j}$$

Referring once more to FIG. 4, it is plain that $L(a,b)=L(b,a)=1$ and $L(a,c)=L(c,a)=1$ but $L(b,c)=L(c,b)$ 0. FIG. 4 also illustrates how the time differences, $d_{i,j}$, are derived. Thus $\delta_{i,j}$ is the time by which base station i's time is advanced with respect to the time of base station j and excludes any time delay due to intervening distance.

Suppose base station i will be retarded by a compensation amount $C_i$ which is to be computed. Following such compensation, the new timing error between base stations i and j will be given by $$\delta'_{i,j} = \delta_{i,j} - C_i + C_j$$

If all measurements were completely accurate and consistent, we could simply solve the equations to make $\delta'_{i,j}=0$ for all i and all j.

However, given measurement errors it is better to solve for a minimum sum square error, that is, $$\sum_{i=1}^{N} \sum_{j=1}^{N} L(i,j)\delta'^2_{i,j}$$

should be minimised. Expanding this gives:—

$$\sum_{i=1}^{N} \sum_{j=1}^{N} L(i,j)\{\delta^2_{i,j} + C_i^2 + C_j^2 + 2(\delta_{i,j} \cdot C_j - \delta_{i,j} \cdot C_i - C_i \cdot C_j)\}$$

Let $$M(i) = \sum_{j=1}^{N} L(i,j)$$

be the number of base stations whose synchronisation transmissions base station i can hear and who can also hear base station i's synchronisation transmission. We can then express the sum square error as $$2\sum_{i=1}^{N} M(i)C_i^2 + \sum_{i=1}^{N}\sum_{j=1}^{N} L(i,j) \cdot \delta^2_{i,j} - 4\sum_{i=1}^{N} C_i \sum_{j=1}^{N} L(i,j) \cdot \delta_{i,j} - 2\sum_{i=1}^{N}\sum_{j=1}^{N} L(i,j) \cdot C_j$$

Now differentiate with respect to $C_i$ and equate to zero. We obtain $$4M(i) \cdot C_i - 4\sum_{j=1}^{N} L(i,j) \cdot \delta_{i,j} - 4\sum_{j=1}^{N} L(i,j) \cdot C_j = 0$$

Thus $$M(i) \cdot C_i - \sum_{j=1}^{N} L(i,j) \cdot C_j = \sum_{j=1}^{N} L(i,j) \cdot \delta_{i,j}$$

We can express this in matrix notation as $$(\text{diag}(M)-L) \cdot C = D$$

where diag(M) is the diagonal matrix with elements M(i), i $\in \{1 \ldots N\}$ along the diagonal, L is the matrix with elements L(i,j), C is the vector with elements $C_i$, and D is a vector with elements $$D_i = \sum_{j=1}^{N} L(i,j) \cdot \delta_{i,j} = \sum_{j=1}^{M(i)} \delta_{i,s_j(i)}$$

where $S_j(i)$, j $\in \{1 \ldots M(i)\}$ is the set of indices of base stations to and from which base station i can send and receive synchronisation transmissions respectively.

Let A=(diag(M)−L)

This matrix is singular, i.e. has no inverse. This reflects the fact that any common value can be added to all compensation values, $C_i$, without affecting the sum square error. A reasonable constraint to apply to the compensation values is that their sum should be zero so as to minimise the overall drift. Thus, we have an additional equation:—

$$\sum_{i=1}^{N} C_i = 0$$

This can be reflected in the matrix equation by adding a row of ones to any of the rows in A to form A'.

We can now solve the equation to obtain the compensation values. However, we can note that A (and therefore A') does not change very rapidly, if at all, since it is a function only of the base station connectivity. Thus, it may be more efficient to compute the inverse of A' which need only be updated infrequently. We thus obtain:—

$$C = (A')^{-1} \cdot D$$

Having these compensation values, $C_i$, each base station in the telecommunications system can be synchronised with every other base station. In addition to fulfilling the requirements of UTRA TDD mode, synchronisation is important in locating mobile stations.

A mobile station may need to be located within its cell, notably when the user makes an emergency call or simply in order to ensure a clean hand-over as the mobile station crosses into a neighbouring cell. Position measurements can be performed on the basis of delay measurements. A minimum of three base stations must be involved in the measurements in order to obtain an unambiguous location. This is because two dimensions of space plus time must be determined. In order for such positioning to be performed the base stations involved must either be synchronised or at least know their mutual time difference to a high accuracy. The periodic updating described earlier may not provide accurate enough synchronisation for position location.

According to the third embodiment of the present invention, requesting the location of a mobile station initiates a set of synchronisation measurements between the base stations involved. Before this can be done, it must be determined which base stations are involved. The simplest, although least efficient, approach to determining this set of measurements is to assume that the base station to which the mobile station is affiliated and the list of base stations neighbouring that base station are all involved.

A more efficient approach would be to arrange for the mobile station to monitor the signal strength of the BCCH channels of the neighbouring base stations and report the addresses of the two (or more) base stations providing the strongest signals. Alternatively, the mobile stations can simply report the actual BCCH signal strength and the receiving base station or the RNC can determine the base stations to be involved. The BCCH signal strength can be measured by correlating against the appropriate training sequences. It will be understood that these measurements will be performed anyway to support the hand-over decision process.

Once the set of base stations involved has been determined, the schedules for synchronisation measurements can be established for each base station. The procedure is then identical to that described previously for normal synchronisation. The mobile station is also instructed to make, at a suitable time, a transmission at full power on the RACH using, preferably, the same burst structure as defined earlier for inter base station transmissions. The time for this transmission should be close to the transmission times for the inter base station synchronisation transmission in order to minimise the effect of clock drift. However, the mobile station transmission may be before, interspersed with or after the inter base station synchronisation transmissions. In a preferred implementation, the RNC will select the schedule for the mobile station to make its transmission. This will be signalled to the mobile station on a suitable signalling channel by the base station to which it is affiliated. Other means of scheduling are not precluded. The RNC will also instruct the base stations involved to signal, preferably in their BCCH channel, to their affiliated mobile stations that random access transmission is unavailable in that particular RACH time slot.

Alternatively, this RNC instruction may be restricted to just the base station to which the mobile station is affiliated. The rationale for this restriction is that the mobile station is transmitting at full power and so can easily reach the base station at the centre of its own cell with enough power to make RACH reception possible. However, the range to the other base stations will typically be greater than the range from any mobile station attempting to transmit in a RACH within the cells of those other base stations. Since these cells will use power control, it is possible for the processing gain between the various training sequences to facilitate simultaneous reception.

The three (or more) base stations will each receive the signal from the mobile station and compare the reception time with their own timing. Given that the positions of the base stations will be known, this will provide all of the information needed to locate the mobile station.

Following any of the various transmissions required to support positioning, it may be discovered that either inter base station synchronisation transmissions or the transmission from the mobile station have not been received adequately. The RNC can schedule repeat transmissions as necessary, either to facilitate computation of the position or to improve its accuracy.

So far the discussion of synchronisation has covered only fine synchronisation after coarse synchronisation has already been achieved.

With an RNC in control, initial coarse synchronisation can be achieved in a straightforward manner. When a network is commissioned the base stations may be activated in sequence either by manual intervention or under control of the RNC. The first base station to be activated becomes the temporary timing master and makes periodic synchronisation burst transmissions in its RACH channel. Other base stations, activated later are only allowed to transmit after they have received a synchronisation burst. In this way the network will become synchronised globally. If an individual base station requires re-synchronisation, following a failure and repair, for example, again that base station is not allowed to transmit until it has received a RACH synchronisation burst from at least one other base station. It may then make its own RACH burst transmission, after making a coarse update to its timing from the initial burst.

The above achieves slot and frame synchronisation since the RACH slot is in a fixed position within the frame. Multi-frame synchronisation can be achieved by a number of means. The simplest and preferred method is to make the RACH slot which is 'stolen' for synchronisation always be contained in the first frame or any fixed arbitrary numbered frame within a multi-frame.

None of the above description precludes the incorporation of base stations equipped with a GPS receiver. In this case, the compensation values, $C_i$, for those base stations are set equal to zero and the constraint that the sum of compensation values equals zero is removed. In this way, the synchronisation scheme will cause all of the base stations involved to become synchronised either directly or indirectly to GPS.

The invention claimed is:

1. A method for synchronizing between base stations in a telecommunications system which includes a plurality of cells, each of which cells has one of said of base stations and at least one mobile station situated therein, the method comprising:
   a) providing at least one channel comprising time slots, for usage in the plurality of cells;
   b) each base station transmitting a synchronization signal, in a given one of the at least one channel, to remaining base stations within transmission range of each respective base station;
   c) for each base station, calculating respective time differences between corresponding time slots transmitted by the respective base station and received from the respective other base stations within transmission range of the base station; and
   d) adjusting timing of the synchronization signals of the respective base station according to calculated time differences;
   wherein the given one of the at least one channel, by which the synchronization signal is transmitted from each of the plurality of base stations to said remaining base stations, is a random access channel transmitted at a frequency within a band of frequencies that is provided for communications between mobile stations and base stations.

2. The method according to claim 1, comprising:
   e) for each of the plurality of base stations, reporting the time differences calculated in step c) to a radio network controller;
   f) calculating a synchronizing adjustment corresponding to each base station from the reported time differences;
   g) informing each base station individually of the corresponding synchronizing adjustment calculated in step f); and
   h) synchronizing each base station according to the corresponding synchronizing adjustment.

3. The method according to claim 1, further comprising:
   i) each respective base station acting autonomously on the time differences calculated in step c) by adjusting its synchronization to minimize the time differences.

4. The method according to claim 1, wherein the random access channel comprises a time slot per TDMA frame.

5. The method according to claim 4, wherein the random access channel is allocated to uplink transmissions in order to initiate communications.

6. The method according to claim 5, wherein communications are initiated by requesting a resource unit for uplink usage.

7. The method according to claim 4, further comprising:
   j) allocating utilization of each random access channel time slot for base station synchronization according to a schedule.

8. The method according to claim 4, further comprising:
   k) using a second channel of said at least one channel to silence uplink communications in the random access channel time slots to allow the transmission of synchronization transmissions from each respective base station to other base stations.

9. The method according to claim 8, wherein the second channel is a broadcast control channel.

10. The method according to claim 1, wherein the random access channel time slot used is always contained in a fixed numbered frame within a plurality of multi-frames in order to synchronize the plurality of base stations over multi-frames.

11. A method of locating a mobile station within a telecommunications cell forming part of a telecommunications system which includes a base station and at least one mobile station, the method comprising:
   determining the location of at least three base stations;
   scheduling synchronization measurements for each of the base stations utilizing a random access channel by each of the base stations transmitting a synchronization signal to the remaining base stations within its transmission range, via said random access channel
   transmitting a signal from the mobile station;
   receiving the transmitted signal at each of the three base stations;
   comparing the received signals with timing signals in each of the base stations; and
   using the comparison at each base station to determine the location of the mobile station.

* * * * *